(12) United States Patent
Chung et al.

(10) Patent No.: US 9,191,121 B2
(45) Date of Patent: Nov. 17, 2015

(54) OPTICAL TRANSMITTER AND METHOD THEREOF

(71) Applicant: Electronics and Telecommunications Research Institute, Daejeon-si (KR)

(72) Inventors: Hwan-Seok Chung, Daejeon-si (KR); Sun-Hyok Chang, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 95 days.

(21) Appl. No.: 14/082,856

(22) Filed: Nov. 18, 2013

(65) Prior Publication Data

US 2014/0294401 A1    Oct. 2, 2014

(30) Foreign Application Priority Data

Mar. 27, 2013    (KR) .................. 10-2013-0032990

(51) Int. Cl.
*H04B 10/556* (2013.01)
*H04B 10/50* (2013.01)

(52) U.S. Cl.
CPC ........ *H04B 10/5561* (2013.01); *H04B 10/5053* (2013.01); *H04B 10/50575* (2013.01)

(58) Field of Classification Search
None
See application file for complete search history.

(56) References Cited

U.S. PATENT DOCUMENTS

| 7,266,306 | B1 * | 9/2007 | Harley et al. | ................ 398/182 |
| 2006/0127104 | A1 * | 6/2006 | Harley et al. | ................ 398/198 |
| 2012/0207480 | A1 | 8/2012 | Lee et al. | |

FOREIGN PATENT DOCUMENTS

KR    10-2012-0099171 A    9/2012

* cited by examiner

*Primary Examiner* — Darren E Wolf
(74) *Attorney, Agent, or Firm* — Rabin & Berdo, P.C.

(57) ABSTRACT

An optical transmitter including an optical modulator comprising a first modulator and a second modulator connected in parallel to each other in the form of a Mach-Zehnder interferometer, and a phase shifter connected to the second modulator in series, a high-speed generator configured to generate a single carrier signal or multi-carrier signals and apply the generated single carrier signal or multi-carrier signals to the optical modulator, and an output stabilizer configured to stabilize a final output optical signal of the optical modulator by controlling a bias of each of the first modulator, the second modulator and the phase shifter.

15 Claims, 11 Drawing Sheets

OPTICAL TRANSMITTER AND METHOD THEREOF

CROSS-REFERENCE TO RELATED APPLICATION

This application claims the benefit under 35 U.S.C. §119 (a) of Korean Patent Application No. 10-2013-0032990, filed on Mar. 27, 2013, the entire disclosure of which is incorporated herein by reference for all purposes.

BACKGROUND

1. Field

The following description relates to an optical transmitter for high-speed optical signal transmission, and more particularly, to an optical transmitter having a phase shift keying scheme, and a method thereof.

2. Description of the Related Art

Due to constantly increasing data traffic such as video and smart phone data, the communication speed used in an optical network is getting faster. In particular, a signal having a speed equal to or larger than 40 Gbps per wavelength appears to meet a bandwidth demand at points where data traffic is concentrated, such as high-performance computing, a server, a data center, an enterprise network, an Internet exchange center, and the like.

Methods of transmitting data that is modulated at a high speed using light include a non-return-to-zero (NRZ) or a return-to-zero (RZ) scheme, in which the amplitude of an optical signal is turned on/off according to an input electrical data, and a phase shift key (PSK) modulation scheme and a differential quaternary phase shift key (QPSK) modulation scheme, in which the phase of an optical signal is modulated.

Methods of transmitting a digital signal that is modulated as described above are divided into a single carrier scheme in which the signal is transmitted over a single carrier, and a multicarrier scheme in which the signal is transmitted over multiple carriers at a significantly lowered speed per carrier.

As for the single carrier transmission scheme, phase shift key modulation in which the phase of an optical signal is modulated to transmit a high-speed signal over a single carrier, and quadrature phase shift key (QPK) modulation and quadrature amplitude modulation (QAM) modulation in which two or more bits are transmitted during a single symbol, may be used. In these schemes, electrical data is directly applied to an optical modulator to modulate the phase of the optical signal.

According to the multicarrier transmission scheme, which is known as orthogonal frequency division multiplexing (OFDM), high-speed data is converted into low-speed data and modulated through QPSK or QAM, and then transmitted in light over multiple carriers by use of fast fourier transform (FFT).

In both of the single carrier scheme and the multicarrier scheme, an optical Inphase-Quadrature (IQ) modulator is used to modulate an optical signal using an electrical signal. By controlling the optical IQ modulator properly, the quality of the modulated optical signal is maintained. Accordingly, an optical transmitter provided with an optical IQ modulator needs to maintain an optimum operating point regardless of surrounding temperature while supporting the single carrier scheme and the multicarrier scheme.

SUMMARY

The following description relates to an optical transmitter capable of performing stable and multi-functional optical transmission by using a single carrier and a multi-carrier optical modulation scheme.

In one general aspect, an optical transmitter includes an optical modulator, a high-speed signal generator and an output stabilizer. The optical modulator may include a first modulator and a second modulator connected in parallel to each other in the form of a Mach-Zehnder interferometer, and a phase shifter connected to the second modulator in series. The high-speed signal generator may be configured to generate a single carrier signal or multi-carrier signals and apply the generated single carrier signal or multi-carrier signals to the optical modulator. The output stabilizer may be configured to stabilize a final output optical signal of the optical modulator by controlling a bias of each of the first modulator, the second modulator and the phase shifter.

In another general aspect, an optical transmission method includes generating a high-speed signal including a single carrier signal or multi-carrier signals, optically modulating the high-speed signal through a first modulator and a second modulator connected in parallel to each other in the form of a Mach-Zehnder interferometer, and a phase shifter connected to the second modulator in series, and stabilizing a final output optical signal by controlling a bias of each of the first modulator, the second modulator and the phase shifter.

Other features and aspects will be apparent from the following detailed description, the drawings, and the claims.

Throughout the drawings and the detailed description, unless otherwise described, the same drawing reference numerals will be understood to refer to the same respective elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness. In addition, while parts of the present invention are named and described below with reference to their functionalities, alternative terminology may be employed, as desired by a user, operator, or according to conventional practice, without altering the content of the disclosure.

Figure 1:
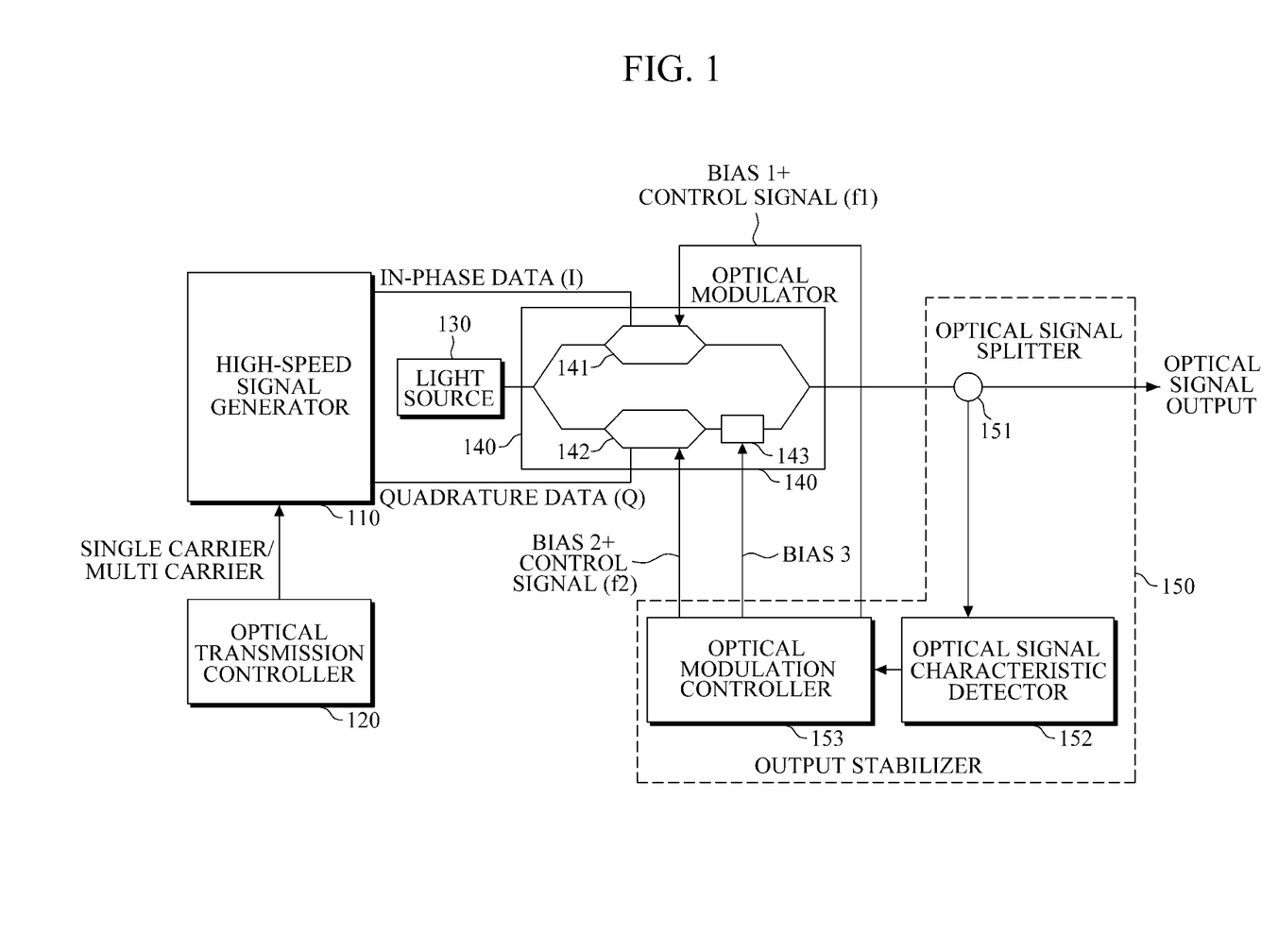
FIG. 1 is a block diagram illustrating a configuration of an optical transmitter in accordance with an example embodiment of the present disclosure.

FIG. 1 is a diagram illustrating a configuration of an optical transmitter in accordance with an example embodiment of the present disclosure.

Referring FIG. 1, an optical transmitter includes a high-speed signal generator 110, an optical transmission controller 120, a light source 130, an optical modulator 140 and an output stabilizer 150.

The high-speed signal generator 110 generates signals having various modulation schemes through digital signal processing, and in accordance with an example embodiment of the present disclosure, the high-speed signal generator 110 generates a single carrier signal or multi-carrier signals. An In-phase (I) signal and a Quardature (Q) signal that are output from the high-speed signal generator 110 are connected to high-speed signal applying ports of the optical modulator 140. In addition, the generated digital signal may be converted into an analog signal through a digital to analog converter (DAC) before being applied to the optical modulator 140.

The optical transmission controller 120 controls the high-speed signal generator 110 to generate a single carrier signal or multi carrier signals. To accomplish this, the optical transmission controller 120 adjusts a modulation scheme and a speed.

The light source 130 is a component for outputting an optical signal and may represent a laser diode (LD).

The optical modulator 140 receives an optical signal output from the light source 130, modulates data applied from the high-speed signal generator 110 into an optical signal, and outputs the modulated optical signal. That is, an I-data and a Q-data applied from the high-speed signal generator 110 are converted into an optical signal in the Mach-Zehnder Interferometer (MZI) optical modulator.

The optical modulator 140 includes a first modulator 141 and a second modulator 142 connected in parallel to each other, and an In-Phase signal is input into the first modulator 141 and a Quadrature signal is input into the second modulator 142. Only when optical signals converted in the first modulator 141 and the second modulator 142 are 90 degrees out of phase do the optical signals operate stably. Accordingly, the optical modulator 140 includes a phase shifter 143 to shift an output of the second modulator 142.

The output stabilizer 150 applies bias dithering signals having frequencies f1 and f2 to the first modulator 141 and the second modulator 142, respectively, and detects and analyzes the amplitude of an optical signal output from the optical modulator 140 to adjust bias dithering signals having frequencies of f1 and f2 and biases that are to be applied to the optical modulators 140, so that the optical modulator 140 operates in a stable manner. Such a process is consistently controlled through a feedback loop and repeated. The frequencies f1 and f2 may be different from each other or the same as each other. In a case in which the frequencies f1 and f2 are same as each other, the biases may be subject to dithering at different points of time through a time-division multiplexing (TDM) scheme. In addition, although not shown in the drawing, in a case in which the frequencies f1 and f2 are same as each other, waveforms of f1 and f2 may be provided as square waves.

However, for convenience, the following description concerns the case in which the frequencies of f1 and f2 are different from each other.

The optical stabilizer 150 includes an optical signal splitter 151, an optical signal characteristic detector 152, and an optical modulation controller 153.

The optical signal splitter 151 is formed on an output line of the optical modulator 140 to branch the output optical signal to the optical signal characteristic detector 152. The optical signal splitter 151 may be embodied as an optical coupler.

The optical signal characteristic detector 152 receives the optical signal branched by the optical signal splitter 151, converts the received optical signal into an electrical signal, and outputs the electrical signal to the optical modulation controller 153. The detailed configuration of the optical signal characteristic detector 152 will be described later with reference to FIGS. 5A and 5B.

The optical modulation controller 153 applies initial values of bias dithering signals having different frequencies f1 and f2 to the first modulator 141 and the second modulator 142, respectively, and analyzes the electrical signal output from the optical signal characteristic detector 152 to generate bias values that are to be applied to the modulators 141 and 142 and the phase shifter 143 of the optical modulator 140 in addition to the bias dithering signals having different frequencies f1 and f2 applied to the two modulators 141 and 142. The detailed configuration of the optical modulation controller 153 will be described later with reference to FIG. 6.

Hereinafter, a method of determining, by the output stabilizer 150, the bias value and the bias dithering signals having different frequencies f1 and f2 that are input into the optical modulator 140 for stabilization will be described with reference to FIGS. 2A to 4B.

Figure 2A:
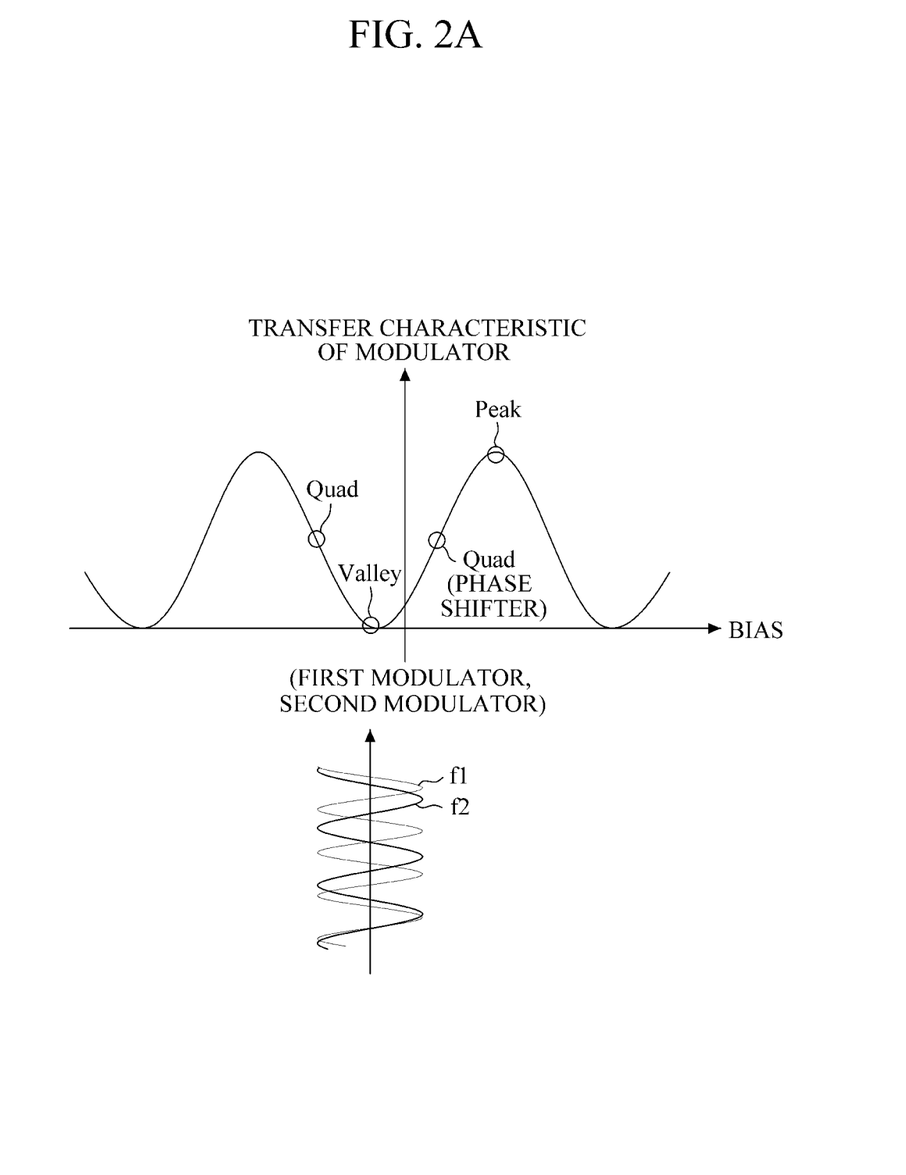
FIG. 2A is a drawing illustrating a transfer characteristic of an optical modulator that is stabilized.

FIG. 2A is a diagram illustrating a transfer characteristic of an optical modulator that is stabilized.

Referring to FIG. 2A, in order to stabilize the optical transmitter, the first modulator 141 and the second modulator 142 need to operate at a valley of the transfer characteristic. In addition, the phase shifter 143 configured to maintain a phase difference of 90 degrees between the Inphase component and the Quadrature component needs to operate at a quad between the peak and the valley.

Figure 2B:
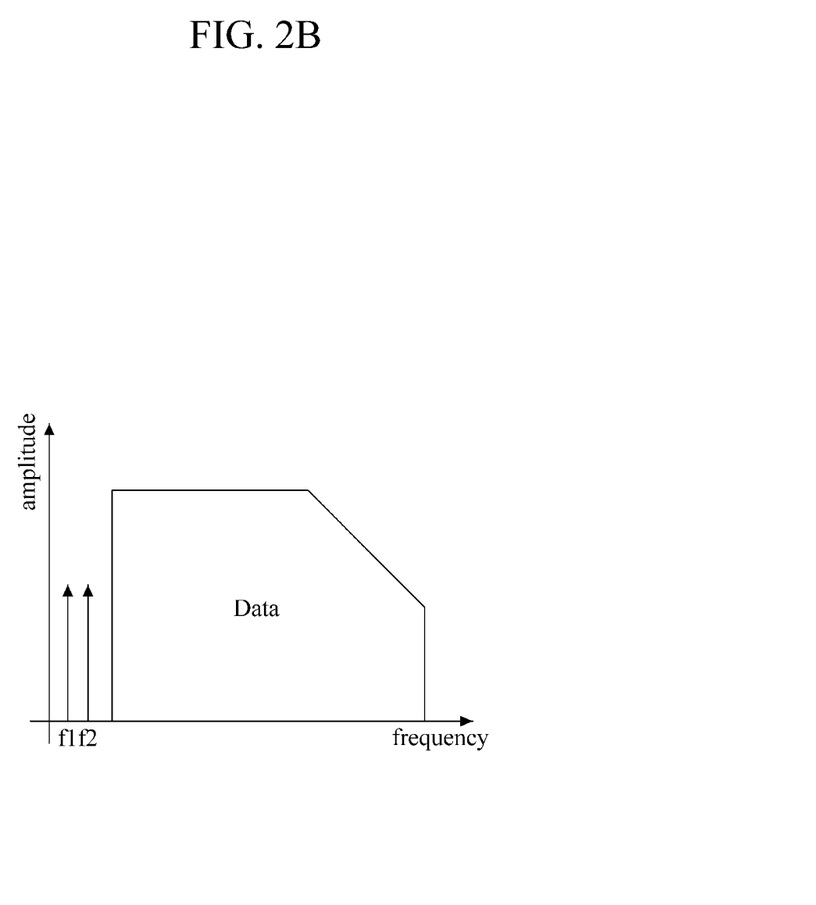
FIG. 2B is a drawing illustrating a signal spectrum represented in a frequency domain after application of bias dithering signals having different frequencies f1 and f2.

FIG. 2B is a diagram illustrating a signal spectrum represented in a frequency domain after application of bias dithering signals having different frequencies f1 and f2.

Referring to FIG. 2B, the bias dithering signals having different frequencies f1 and f2 which are configured to generate a control signal are applied in a lower frequency range than data so as to reduce interference with the data.

Figure 3:
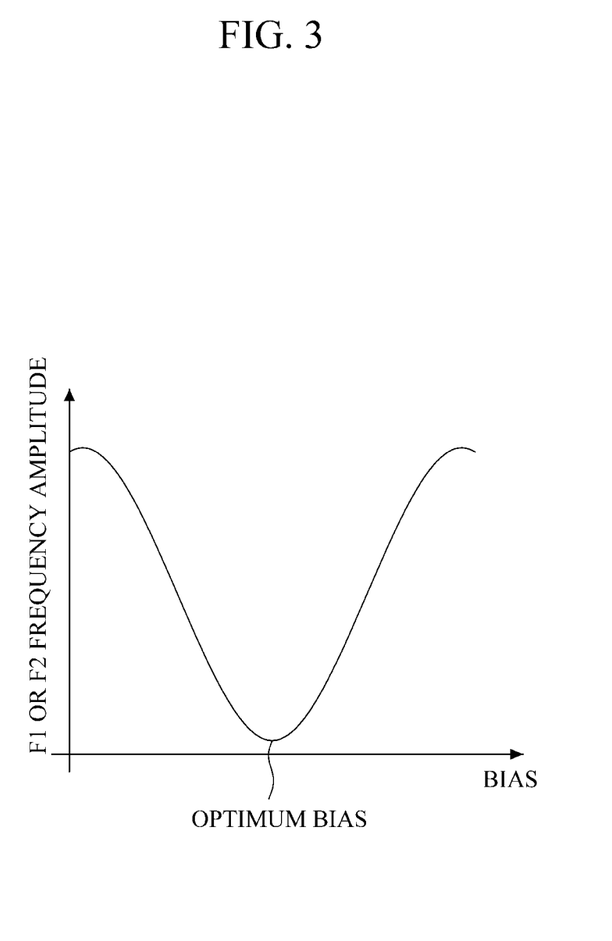
FIG. 3 is a drawing illustrating amplitudes of bias dithering signals having different frequencies f1 and f2 according to change in the applied bias.

FIG. 3 is a diagram illustrating amplitudes of bias dithering signals having different frequencies f1 and f2 according to change in applied bias.

Referring to FIG. 3, bias dithering signals having different frequencies f1 and f2 are applied to the first modulator 141 and the second modulator 142, and detected amplitudes of the bias dithering signals having different frequencies f1 and f2 have the same form as a transfer characteristic. Accordingly, in order to control an optimal bias as shown in FIG. 2A, the detected bias dithering signal components having different frequencies f1 and f2 need to be controlled to have minimum amplitudes.

Figure 4A:
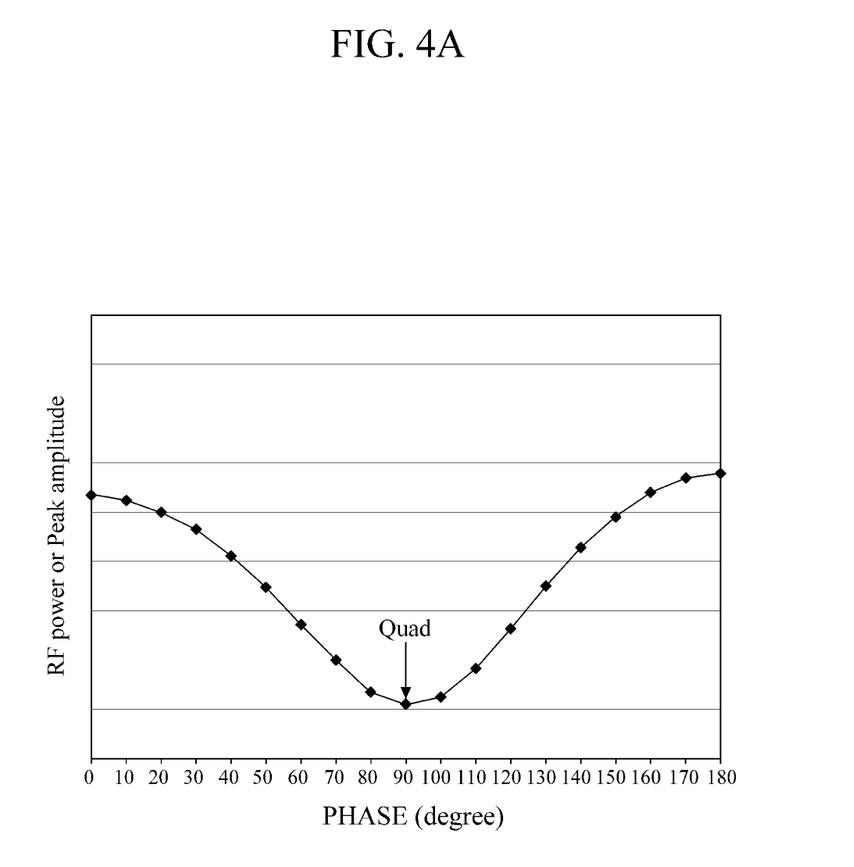
FIG. 4A is a drawing illustrating an RF power or a maximum amplitude of a signal according to a phase difference between an Inphase component and a Quadrature component that are converted into optical signals.

FIG. 4A is a diagram illustrating an RF power or a maximum amplitude of a signal according to a phase difference between an Inphase component and a Quadrature component that are converted into an optical signal.

Referring to FIG. 4A, if the phase difference between the two signal components approaches 90 degrees, a RF power or a maximum amplitude of a signal is reduced, and at 90 degrees, reaches the lowest value. Accordingly, in order to maintain the phase difference between the two signal components at 90 degrees, bias of the phase shifter 143 needs to be adjusted in a way to minimize the RF power or the maximum amplitude of the detected signal.

Figure 4B:
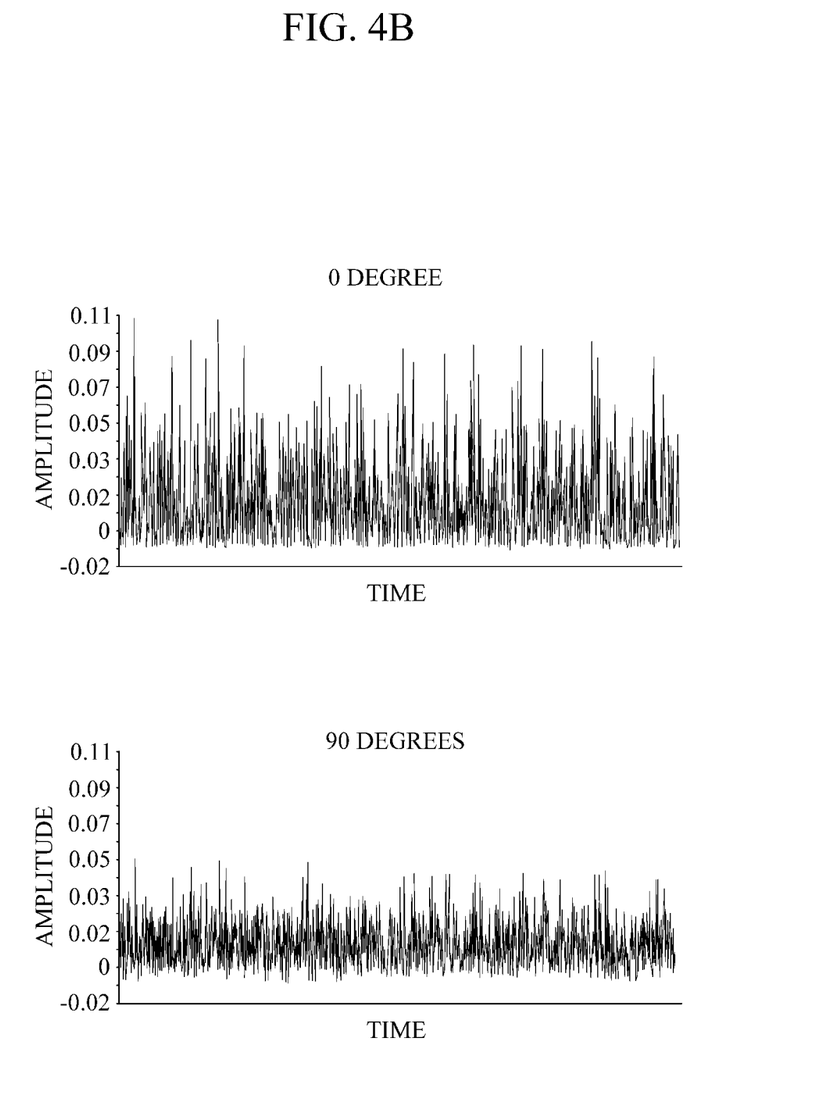
FIG. 4B is a drawing illustrating a waveform of a signal according to the phase difference between the Inphase signal and the Quadrature signal when multicarrier signals are generated.

FIG. 4B is a waveform of a signal according to the phase difference between the Inphase signal and the Quadrature signal when multicarrier signals are generated.

Referring to FIG. 4B, the maximum amplitude of a signal at a phase difference of 90 degrees is lower than at a phase difference of 0 degrees. Accordingly, after the maximum amplitude is detected from a signal waveform, the amplitude of the signal is controlled to be minimized.

Figure 5A:
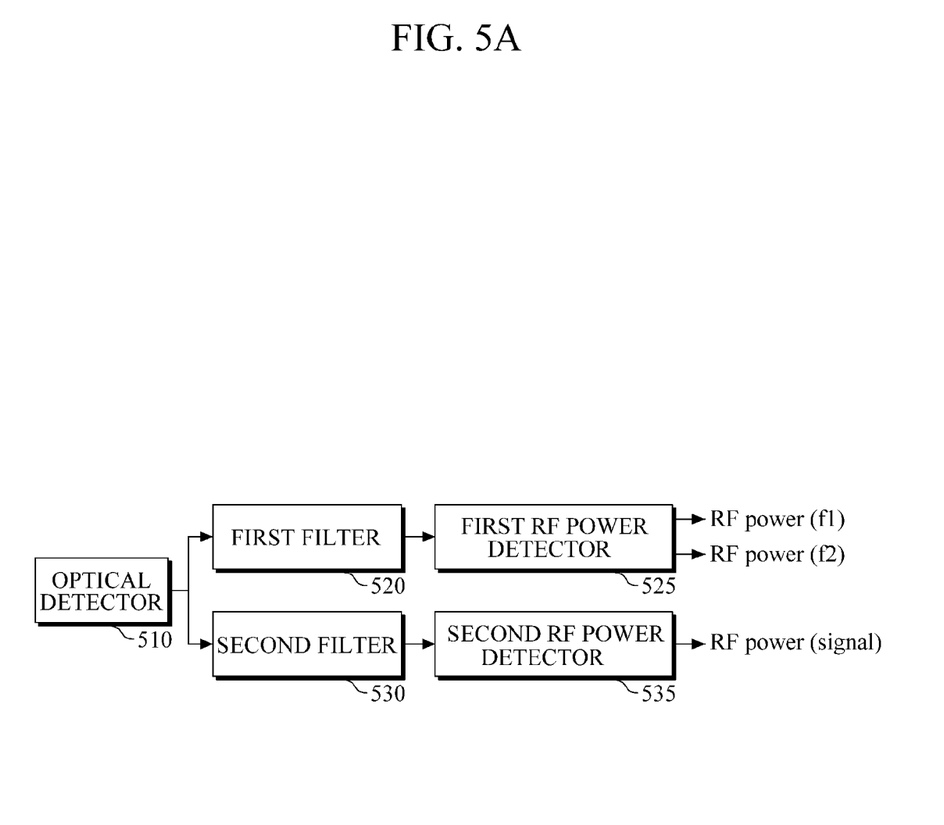
FIG. 5A is a drawing illustrating an optical signal characteristic detector in accordance with an example embodiment of the present disclosure.

FIG. 5A is a drawing illustrating an optical signal characteristic detector in accordance with an example embodiment of the present disclosure.

Referring to FIG. 5A, the optical signal characteristic detector 152 includes an optical detector 510, a first filter 520, a first RF power detector 525, a second filter 530 and a second RF power detector 535.

The optical detector 510 converts an optical signal output from the optical signal splitter 151 into an electrical signal and outputs the electrical signal.

The first filter 520 separates bias dithering signal components having different frequencies f1 and f2 from the electrical signal output from the optical detector 510 and outputs the separated bias dithering signal components. The first RF power detector 525 detects power amplitudes of the bias dithering signal components having different frequencies f1 and f2.

The second filter 530 separates a signal component of the high-speed data signal output from the optical detector 510. The second RF power detector 535 measures the power of a signal that is output from the second filter 530.

Figure 5B:
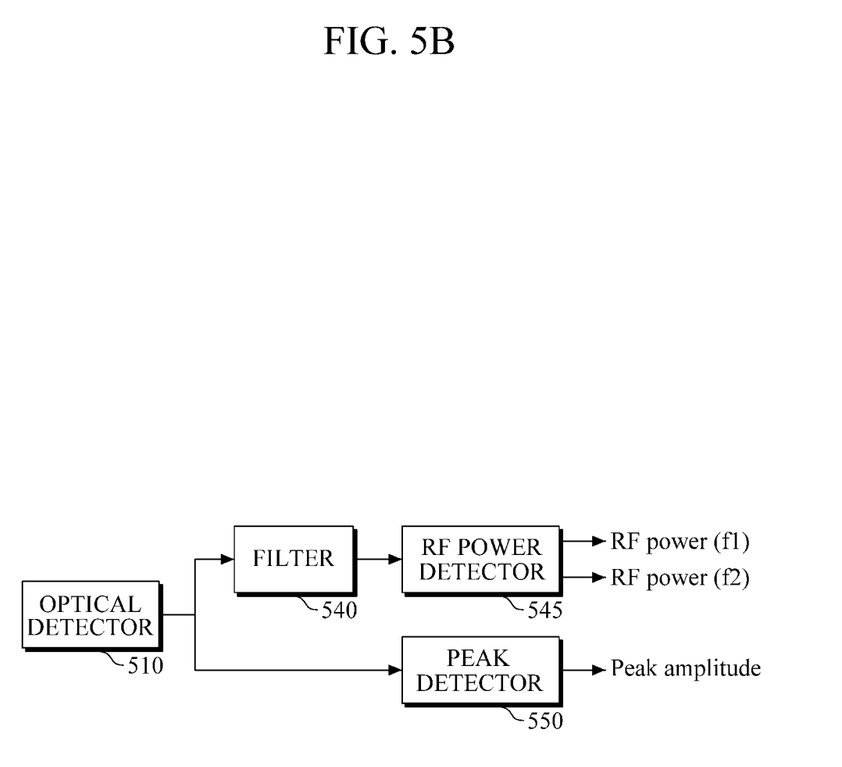
FIG. 5B is a drawing illustrating an optical signal characteristic detector in accordance with another example embodiment of the present disclosure.

FIG. 5B is a drawing illustrating an optical signal characteristic detector in accordance with another example embodiment of the present disclosure.

Referring to FIG. 5B, the optical signal characteristic detector 152 includes the optical detector 510, a filter 540, an RF power detector 545 and a peak detector 550.

The optical detector 510 converts an optical signal output from the optical signal splitter 151 into an electrical signal and outputs the electrical signal.

The filter 540 separates bias dithering signal components having different frequencies f1 and f2 from the electrical signal output from the optical detector 410 and outputs the separated bias dithering signal components. The RF power detector 545 detects and output power amplitudes of the bias dithering signal components having different frequencies f1 and f2.

The peck detector 550 detects a maximum value of the signal output from the optical detector 510.

Figure 6:
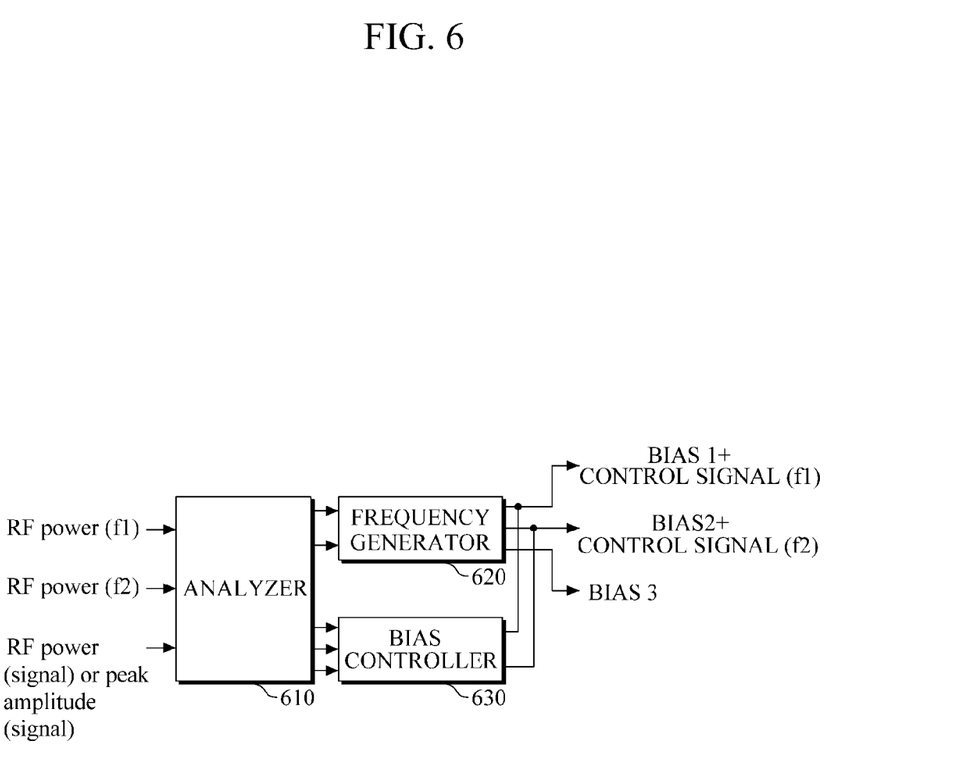
FIG. 6 is a drawing illustrating a detailed configuration of an optical modulation controller in accordance with an example embodiment of the present disclosure.

FIG. 6 is a drawing illustrating a detailed configuration of an optical modulation controller in accordance with an example embodiment of the present disclosure.

Referring to FIG. 6, the optical modulation controller 170 includes an analyzer 610, a frequency generator 620 and a bias controller 630.

The analyzer 610 performs control such that the signal output from the optical signal characteristic detector 152 is minimized. That is, the analyzer 610 receives the RF power or the maximum value of a signal and controls the frequency generator 620 and the bias controller 630 such that the signal is minimized.

Thereafter, the frequency generator 620 and the bias controller 630, according to a result controlled by the analyzer 610, apply a control signal f1 and a bias 1 to the first modulator 141, apply a control signal f2 and a bias 2 to the second modulator 142, and apply a bias 3 to the phase shifter 143.

Figure 7:
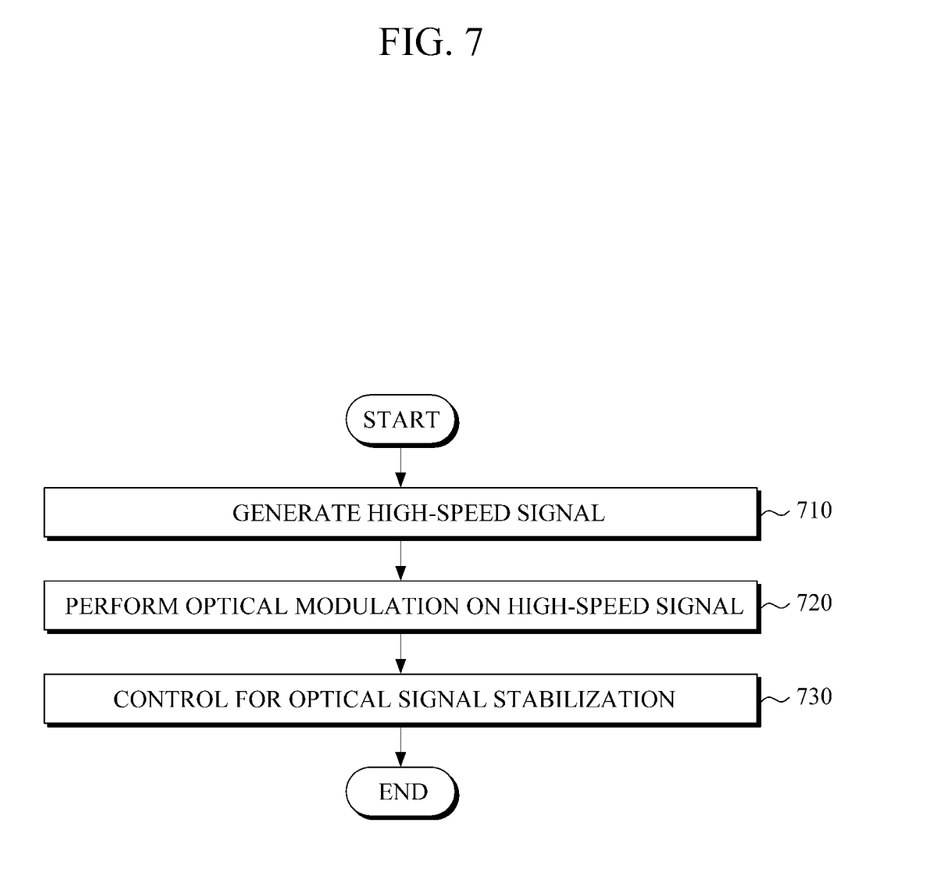
FIG. 7 is a flowchart showing an optical transmission method in accordance with an example embodiment of the present disclosure.

FIG. 7 is a flowchart showing an optical transmission method in accordance with an example embodiment of the present disclosure.

Referring to FIG. 7, an optical transmitter generates a high-speed signal including a single carrier signal or multicarrier signals (710). In this case, in order to generate a single carrier signal or multiple carrier signals, an element including a modulation scheme and speed of a signal is adjusted. In addition, the generated digital signal is converted into an analog signal before being optically modulated.

The optical transmitter performs optical modulation on the high-speed signal through a first modulator and a second modulator connected in parallel to each other in the form of a Mach-Zehnder interferometer, and a phase shifter connected to the second modulator in series (720).

The optical transmitter controls respective biases for the first modulator, the second modulator and the phase shifter, thereby stabilizing a final output optical signal of the optical modulator (730).

Figure 8:
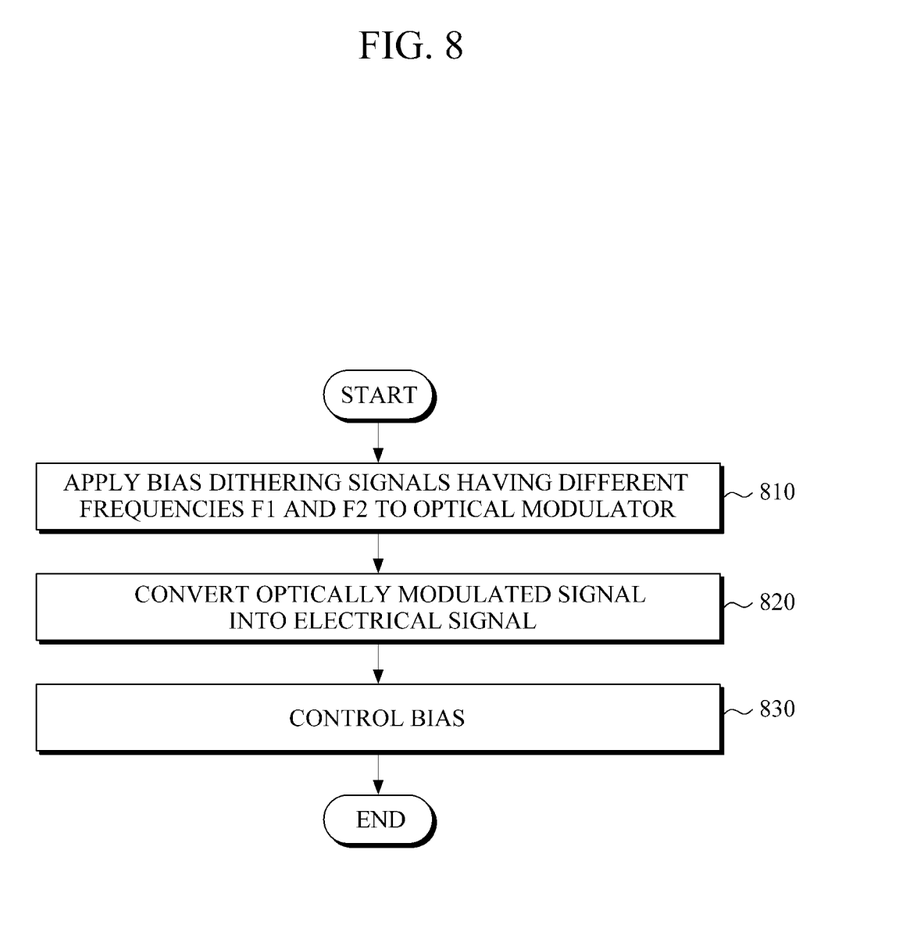
FIG. 8 is a flowchart showing a controlling step for stabilizing an optical signal in accordance with an example embodiment of the present disclosure.

FIG. 8 is a flowchart showing a controlling step for stabilizing an optical signal in accordance with an example embodiment of the present disclosure.

Referring to FIG. 8, the optical transmitter applies bias dithering signals having difference frequencies to the first modulator and the second modulator, respectively (810).

The optical transmitter converts an optically modulated optical signal into an electrical signal (820). In operation 820, two example embodiments may be implemented in accordance with the present disclosure.

In the first example embodiment, the optical transmitter converts an optically modulated optical signal into an electrical signal, separates and outputs bias dithering signal components having different frequencies from the converted electrical signal, and detects and outputs power amplitudes of the output bias dithering signal components having different frequencies, respectively. In addition, the optical transmitter separates and outputs a signal component of the converted electrical signal, and detects and outputs the power amplitude of the output signal.

In the second example embodiment, the optical transmitter converts an optically modulated optical signal into an electrical signal, separates and outputs bias dithering signal components having different frequencies from the converted electrical signal, detects and outputs power amplitudes of the output bias dithering signal components having different frequencies, and measures and detects the maximum value of the converted electrical signal.

The optical transmitter checks voltages of frequencies of bias dithering signals from the converted electrical signal, and controls the bias such that each of the voltages are minimized (830). In detail, the optical transmitter generates a control signal such that the output signal is minimized, applies bias dithering signals having different frequencies to the first modulator and the second modulator, respectively, according to the control signal, and generates and applies bias signals to the first modulator, the second modulator and the phase shifter according to the control signal.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical transmitter comprising:
   an optical modulator comprising a first modulator and a second modulator connected in parallel to each other in the form of a Mach-Zehnder interferometer, and a phase shifter connected to the second modulator in series;
   a signal generator configured to generate a single carrier signal or multi-carrier signals and apply the generated single carrier signal or multi-carrier signals to the optical modulator; and
   an output stabilizer configured to stabilize a final output optical signal of the optical modulator by controlling a bias applied to each of the first modulator, the second modulator and the phase shifter, wherein the output stabilizer comprises:
       an optical signal characteristic detector configured to convert an optical signal output from the optical modulator into an electrical signal; and
       an optical modulation controller configured to apply first and second bias dithering signals, each having a same frequency, to the first modulator and the second modulator, respectively, check voltages of the first and second bias dithering signals from the converted electrical signal, and control each of the biases applied to the first and second modulators such that each of the voltages is minimized.

2. The optical transmitter of claim 1, wherein the signal generator converts a generated digital signal into an analog signal before applying the digital signal to the optical modulator.

3. The optical transmitter of claim 1, wherein the output stabilizer further comprises an optical signal splitter configured to receive a split optical signal output from the optical modulator and output the split optical signal to the optical signal characteristic detector.

4. The optical transmitter of claim 3, wherein the optical signal characteristic detector comprises;
   an optical detector configured to convert an optical signal output from the optical signal splitter into an electrical signal and output the electrical signal;
   a first filter configured to separate a bias dithering signal component from the electrical signal output from the optical detector and output the bias dithering signal component;
   a first RF power detector configured to detect a power amplitude of the bias dithering signal component output from the first filter and output the power amplitude;
   a second filter configured to separate a signal component of the signal that is output from the optical detector and output the signal component; and
   a second RF power detector configured to measure a power of the signal output from the second filter.

5. The optical transmitter of claim 3, wherein the optical signal characteristic detector comprises:
   an optical detector configured to convert an optical signal output from the optical signal splitter into an electrical signal and output the electrical signal;
   a filter configured to separate a bias dithering signal component from the electrical signal output from the optical detector and output the bias dithering signal component;
   an RF power detector configured to detect a power amplitude of the bias dithering signal component output from the filter and output the power amplitude; and
   a peak detector configured to measure and detect a maximum value of the signal output from the optical detector.

6. The optical transmitter of claim 1, wherein the optical modulation controller comprises:
   a frequency generator configured to apply the first and second bias dithering signals to the first modulator and the second modulator, respectively;
   a bias controller configured to first to third generate bias signals and apply the bias signals to the first modulator, the second modulator and the phase shifter, respectively; and
   an analyzer configured to control the frequency generator and the bias controller such that the signal output from the optical signal characteristic detector is minimized.

7. An optical transmission method comprising:
   generating a signal including a single carrier signal or multi-carrier signals;
   optically modulating the signal through a first modulator and a second modulator connected in parallel to each other in the form of a Mach-Zehnder interferometer, and a phase shifter connected to the second modulator in series; and stabilizing a final output optical signal by controlling a bias applied to each of the first modulator, the second modulator and the phase shifter,
   wherein the stabilizing of the final output optical signal comprises:
   applying first and second bias dithering signals, each having a same frequency, to the first modulator and the second modulator, respectively;
   converting the optically modulated signal into an electrical signal; and
   checking voltages of the first and second bias dithering signals from the converted electrical signal, and controlling each of the biases applied to the first and second modulators such that each of the voltages is minimized.

8. The optical transmission method of claim 7, wherein in the generating of the signal, a generated digital signal is converted into an analog signal before the digital signal is optically modulated.

9. The optical transmission method of claim 7, wherein the converting of the optically modulated signal into the electrical signal comprises:
   converting an optical modulated signal into an electrical signal;
   separating a bias dithering signal component from the converted electrical signal and outputting the bias dithering signal component;
   detecting a power amplitude of the output bias dithering signal component and outputting the detected power amplitude;
   separating a signal component of the converted electrical signal and outputting the signal component; and
   detecting a power amplitude of the output signal and outputting the power amplitude.

10. The optical transmission method of claim 7, wherein the converting of the optically modulated signal into the electrical signal comprises:

converting an optically modulated signal into an electrical signal;

separating a bias dithering signal component from the converted electrical signal and outputting the bias dithering signal component;

detecting a power amplitude of the output bias dithering signal component; and measuring and detecting a maximum value of the converted electrical signal.

11. The optical transmission method of claim 7, wherein the controlling of the bias comprises:

generating a control signal such that the output signal is minimized;

applying the first and second bias dithering signals to the first modulator and the second modulator, respectively, according to the control signal; and generating bias signals according to the control signal, and applying the generated bias signals to the first modulator, the second modulator and the phase shifter, respectively.

12. The optical transmitter of claim 1, wherein waveforms of the first and second bias dithering signals are provided as square waves.

13. The optical transmitter of claim 1, wherein the optical modulation controller applies each of the bias to the first modulator, the second modulator and the phase shifter at different points of time through a time-division multiplexing (TDM) scheme.

14. The optical transmission method of claim 7, wherein waveforms of the first and second bias dithering signals are provided as square waves.

15. The optical transmitter of claim 7, wherein each of the bias is applied to the first modulator, the second modulator and the phase shifter at different points of time through a time-division multiplexing (TDM) scheme.

* * * * *